UNITED STATES PATENT OFFICE.

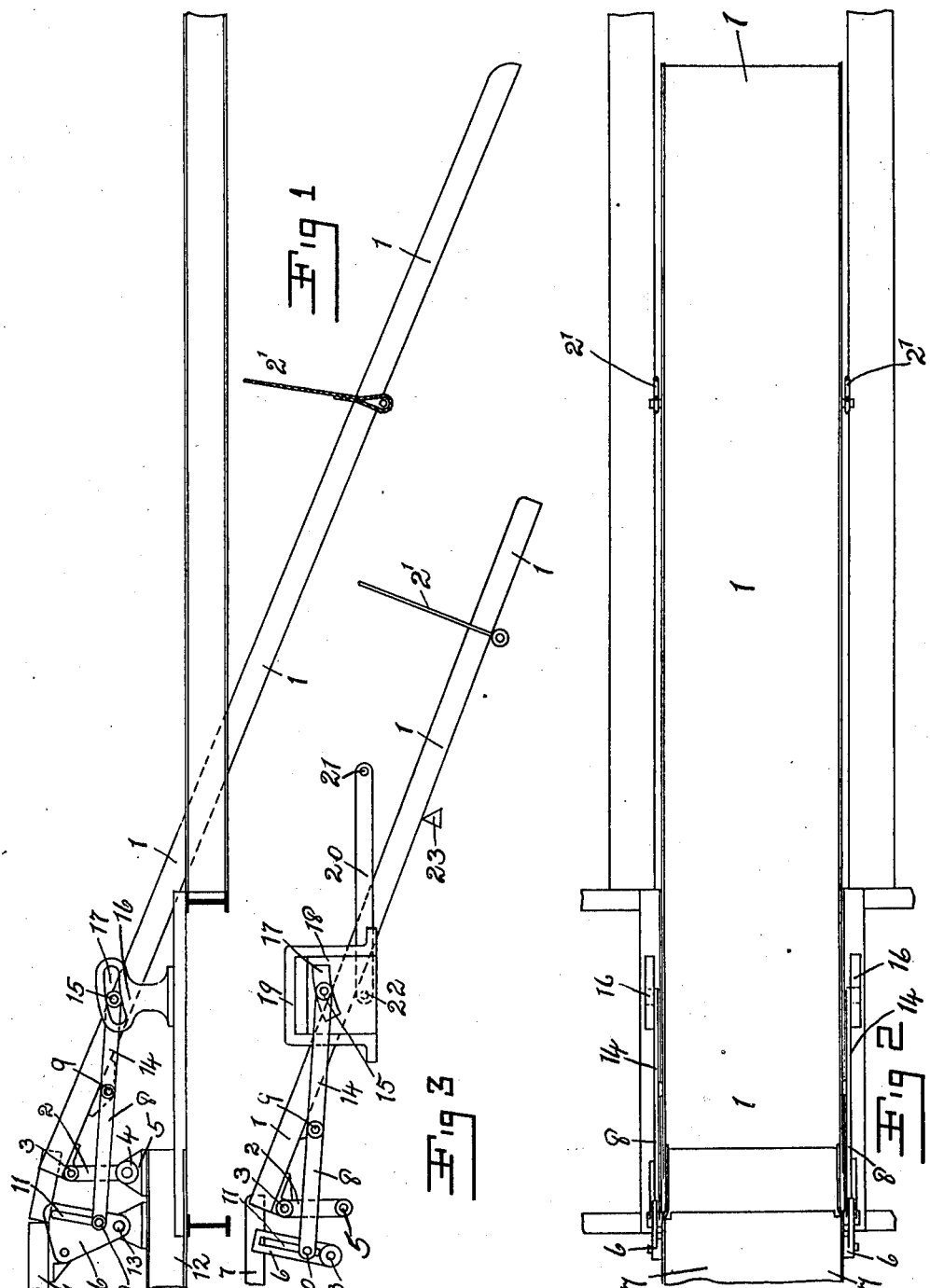

BERTRAM NORTON, OF HAGLEY, STOURBRIDGE, ENGLAND.

CONVEYER.

1,004,186. Specification of Letters Patent. Patented Sept. 26, 1911.

Application filed December 19, 1910. Serial No. 598,040.

*To all whom it may concern:*

Be it known that I, BERTRAM NORTON, engineer, subject of the King of Great Britain, residing at Melbourne House, Worcester Road, Hagley, Stourbridge, in the county of Worcester, England, have invented a new and useful Conveyer; and I do hereby declare the following to be a full, clear, and exact description of the same.

My invention comprises improvements in conveyers or screens and refers to that class of such which are provided with an adjustable chute or the like whereby the material may be directly delivered onto heaps or into containers at various heights; the object of my said invention being to so arrange the chute that the material is discharged or delivered at the same, or substantially the same, rate when the chute is at different heights or inclinations; and in combination therewith means for stopping or substantially stopping reciprocation, when the chute has been raised to a pre-determined height.

According to my invention the chute or like part is reciprocated to assist or cause delivery and in order that the rate of discharge may be equal even when the chute is at different heights I so arrange the chute that when its angle of inclination is at a maximum the amount of its reciprocation is at a minimum, while when the angle is at a minimum the reciprocation is at its maximum, all being so arranged that when the inclination is increased the stroke is automatically reduced, and vice versa, when the chute is raised and the inclination decreased the reciprocation is increased.

Of the various embodiments of which the invention is capable I have selected for illustration a specific embodiment, the structure of which at the present time I consider to exhibit the different features of the invention in the most convenient manner and effective form.

In the accompanying drawings Figure 1 is a side elevation of the chute of a conveyer provided with means for automatically varying the stroke, as it is raised or lowered according to my invention. Fig. 2 is a plan of same, while Fig. 3 is a diagrammatic elevation of a conveyer chute according to my invention provided with means, which will be more fully described hereinafter whereby its reciprocating stroke is reduced to a minimum, when the chute is raised to a pre-determined height.

In carrying my invention into practice as illustrated upon the accompanying drawings the chute 1 is supported at its lower end by wire ropes 2' and at the upper end it is supported freely on a link 2 which is connected to the chute at 3. The link 2 is mounted freely in the bracket 4 by a pivot 5, all so arranged that when the chute 2 is reciprocated the material is "conveyed" down the inclined chute.

The reciprocation is controlled by a rocking arm or crank 6 which is connected to the end 7 of an ordinary reciprocating conveyer and pivoted to the frame 12 at 13. When the conveyer is reciprocated the rocking arm 6 is moved with it, the rocking arm being connected to the chute by means of a lever 8 which is pivotally connected to the chute at 9 and to the rocking arm 6 by its end 10 which engages a slot 11 in the rocking arm 6. Said slot is so arranged that when the end 10 of the lever 8 is moved away from the pivot 13 the reciprocating stroke which is imparted to the chute 1 is increased and when brought toward the pivot 13 said stroke is decreased.

The lever 8 has an extension 14 which is connected at 15 to some normally, stationary or fixed part of the conveyer frame 16 being so arranged that as the chute 1 is raised the lever 8 being connected to the chute 1 at point 9, is caused to move about the pivot 15 moving the end 10 of the lever 8 further from the pivot 13 thus increasing the stroke of the reciprocation imparted to the chute 1, and vice versa as the chute is lowered the stroke is decreased. The pivot 15 is provided with a slot 17 to allow the necessary movement when the lever 8, 14, is reciprocated with the conveyer, this end of the lever being however restricted against vertical movement.

In the drawing at Fig. 3 I have shown an arrangement for stopping, or substantially stopping the delivery when the chute is raised to a pre-determined position, for which purpose the part carrying the pivot end 15 of the lever is automatically raised when the chute enters such position, thereby depressing the part 10 to its minimum stroke position; and as the chute will then be only at a slight incline and is only having a minimum reciprocation there will be little or no tendency for the chute to convey the material; the slot 17 is cut in a block or member 18 said block 18 slides or moves in the frame 19. A lever 20 is pivoted at 21 to a fixed part of the framework (not shown) and is connected to the block 18 at 22. A projection 23 is fixed to the chute 1 and arranged to come into contact with the lever 20 when the chute 1 is raised to a pre-determined height. When the projection 23 strikes the lever 20 the block 18 is raised and with it the connection 15 thereby depressing the end 10 of the lever 8 and reducing the stroke to a minimum.

The material is delivered to the upper end of the chute from the conveyer trough 7 which forms no part of the invention and may be of any suitable reciprocating form. When the chute 1 is in its lowest working position the end 10 of the lever 8, is near the pivot 13 of the rocking arm 6 and the material is caused to pass down the chute 1 by means of the reciprocating movement transmitted from the rocking arm 6, which at the position of the end 10 as shown on the drawings, transfers a short stroke reciprocation. If the lower end of the chute 1 be raised the end 10 of the lever 8, moves away from the pivot 13 owing to the pivot 15 being constrained to remain in the path 17. As the end 10 of the lever 8 moves away from the pivot 13, the length of stroke transferred to the chute 1 is increased. This increase causes the material to be conveyed down the chute 1 at the various angles of inclination through which it passes, as it is obvious the higher the chute 1 is raised the greater the amount of reciprocation that is necessary to cause the material to flow down the chute 1.

The chute 1 may be raised by any suitable means and it will be obvious that when filling a cart or truck the chute will be raised as the top of the load rises.

What I claim then is:

1. In a conveyer, the combination of a reciprocating chute, and means whereby the extent of the reciprocation of the chute is automatically increased when the said chute is raised, and means whereby the extent of reciprocation of the chute is automatically decreased when said chute is lowered; substantially as set forth.

2. In a conveyer, the combination of a reciprocating chute, a lever pivotally secured to the said chute and having its one end pivotally secured to the conveyer framework, a rocking controlling member, and a radially adjustable connection between the rocking member and the free end of the lever; so arranged that when the chute is raised the amount of reciprocation imparted to it is automatically increased and when the chute is lowered the amount of reciprocation imparted to it is decreased; substantially as set forth.

3. In a conveyer, the combination of a reciprocating chute, a conveyer framework, a lever pivotally secured to the chute and having its one end pivotally secured to the framework, a crank, a radial slot in said crank, a radially movable connection between said crank and the free end of said lever, so arranged that when the chute is raised the amount of reciprocation imparted to it is automatically increased and when the chute is lowered the amount of reciprocation imparted to it is decreased; substantially as set forth.

4. In a conveyer the combination of a reciprocating chute means whereby the length of reciprocation of the chute is automatically increased when the said chute is raised and means whereby the length of reciprocation of the chute is automatically decreased when the said chute is lowered, and means for substantially stopping the reciprocation of the chute when the chute has been raised to a pre-determined height; substantially as set forth.

5. In a conveyer, the combination of a reciprocating chute, a lever pivotally secured to the said chute and having its one end pivotally secured, a rocking controlling member, a radially adjustable connection between the rocking member and the free end of the lever; and means for substantially stopping the reciprocation of the chute when the chute has been raised to a pre-determined height; substantially as set forth.

6. In a conveyer, the combination of a reciprocating chute, a conveyer framework, a lever pivotally secured to the chute and having its one end pivotally secured to the framework, a crank, a radial slot in said crank, a radially movable connection between said crank and the free end of said lever, and means for substantially stopping reciprocation of the chute when the chute has been raised to a pre-determined height; substantially as set forth.

7. In a conveyer, the combination of a reciprocating chute, a vertically movable member, a lever pivotally secured to the said chute and having its one end pivotally secured to the said vertically movable member, a rocking controlling member and a radially adjustable connection between the rocking member and the free end of the lever, and means for raising the vertically movable member and thereby substantially stopping the reciprocation of the chute when the chute has reached a pre-determined height; substantially as set forth.

8. In a conveyer, the combination of a reciprocating chute, a pivoted lever, a vertically movable member carried by said lever, a slot in said vertically movable member, a second lever pivotally secured to the said chute and having its one end pivotally secured in the said slot in the vertically movable member, a rocking controlling member, a radially adjustable connection between the rocking member and the free end of the second lever, and means carried by said chute for raising the vertically movable member and thereby substantially stopping the reciprocation of the chute when the chute has reached a pre-determined height; substantially as set forth.

In testimony whereof, I have signed my name to this specification in the presence of two subscribing witnesses.

BERTRAM NORTON.

Witnesses:
HAROLD J. C. FORRESTER,
NORMAN S. BARLOW.

Copies of this patent may be obtained for five cents each, by addressing the "Commissioner of Patents, Washington, D. C."